United States Patent [19]

Yanagi et al.

[11] Patent Number: 5,736,606
[45] Date of Patent: Apr. 7, 1998

[54] AQUEOUS INK OF PIGMENT TYPE

[75] Inventors: Hideki Yanagi; Shigemi Wakabayashi; Kenji Kaida, all of Tochigi-ken, Japan

[73] Assignee: Kao Corporation, Tokyo, Japan

[21] Appl. No.: 775,185

[22] Filed: Dec. 30, 1996

[30] Foreign Application Priority Data

Dec. 28, 1995 [JP] Japan ................................. 7-343032

[51] Int. Cl.$^6$ ................................. C08L 41/00
[52] U.S. Cl. ................................. 524/547; 524/558
[58] Field of Search ................................. 524/547, 558

[56] References Cited

U.S. PATENT DOCUMENTS

| | | |
|---|---|---|
| 4,702,742 | 10/1987 | Iwata et al. . |
| 4,703,080 | 10/1987 | Shay et al. ................... 524/558 |
| 5,037,475 | 8/1991 | Chida et al. . |
| 5,345,254 | 9/1994 | Wong et al. . |
| 5,496,879 | 3/1996 | Griebel et al. ................ 524/558 |
| 5,516,836 | 5/1996 | Sauer et al. ................... 524/558 |
| 5,560,996 | 10/1996 | Ito et al. . |
| 5,610,225 | 3/1997 | Farwaha et al. ............... 524/558 |

FOREIGN PATENT DOCUMENTS

| | | |
|---|---|---|
| 4-189876 | 7/1992 | Japan . |
| 5-9421 | 1/1993 | Japan . |
| 5-65443 | 3/1993 | Japan . |

*Primary Examiner*—Joseph L. Schofer
*Assistant Examiner*—N. Sarofim
*Attorney, Agent, or Firm*—Oblon, Spivak, McClelland, Maier & Neustadt, P.C.

[57] ABSTRACT

An aqueous pigment ink is provided made of a pigment, a dispersant, water, and a water-soluble solvent, wherein the dispersant contains a copolymer of a monomer (a) represented by formula (A), and one or more monomers (b) selected from the group consisting of compounds represented by formulae (B) and (C):

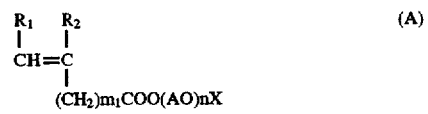

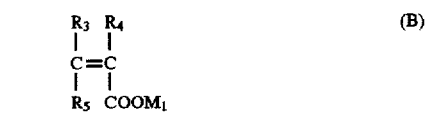

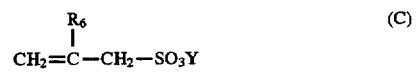

Wherein $R_1$, $R_2$, $R_3$, $R_4$, $R_5$, $R_6$, AO, $m_1$, $m_2$, n, $M_1$, $M_2$ and Y are as defined herein that gives improved jettability, storage stability and printing characteristics.

26 Claims, No Drawings

AQUEOUS INK OF PIGMENT TYPE

BACKGROUND OF THE INVENTION

The present invention relates to an aqueous ink of a pigment type that permits printing without causing clogging at the head portion of an ink jet printer and is excellent in storage stability.

DESCRIPTION OF THE RELATED ART

Aqueous inks are used in many cases as inks for printing and writing utensils because of the ease with which they can be produced and handled. For example, due to the recent development and spread of computers, printing apparatuses have also spread. Aqueous inks are commonly used in such printing apparatuses. The ink jet recording technique is a typical recording technique for these printing apparatuses. Ink jet recording is a recording technique wherein ink droplets are expelled from a very small nozzle directly onto a recording medium to allow the ink droplets to impact on the recording medium, thereby obtaining images, including characters. Lately, this technique has been widely used because this technique not only provides the advantage that the printer used is low in noise and good in operability but also provides the advantage that images can be colored easily and plain paper can be used as a recording medium. Widely used techniques for jetting an ink in personal printers include the piezo-electric technique, which uses a piezo-electric element for a printing head, and the thermal jet technique, which uses a heater of a heating resistor element for a printing head.

Conventional inks used in the above-mentioned ink jet recording include inks of a dye type and a pigment type. Unfortunately, the conventional inks of a dye type are poor in water resistance and light resistance, and the conventional inks of a pigment type tend to clog the nozzle of the head portion and the pigment element precipitates when the ink is stored.

To solve the nozzle clogging problem, in the inks used for ink jet printers, generally a water-soluble dye is used. However, when using a water-soluble dye, while the ink hardly clogs the nozzle, the ink is poor in water resistance and light resistance and, in the case of a thermal jet technique, the dye is oxidized by excess heat at the printing head causing the ink to be scorched easily onto the printing head.

Further, for the inks of a pigment type, in order to prevent the ink from clogging the nozzle and enhance storage stability of the ink, the following methods have been proposed: (1) a method wherein a combination of a dispersant and a carbon black having a pH of 7 or over is used (Japanese Patent Application Laid-Open 4-189876), (2) a method wherein a pigment is emulsified with a core material (Japanese Patent Application Laid-Open 5-9421), and (3) a method wherein a pigment and insoluble resin particles are bonded with an organic silane coupling agent (Japanese Patent Application Laid-Open 5-65443). However, these methods are not still satisfactory.

SUMMARY OF THE INVENTION

Therefore, one object of the present invention is to provide an aqueous ink of a pigment type (hereafter called an "aqueous pigment ink") that permits printing without causing clogging at the head portion of an ink jet printer.

A further object of the present invention is to provide an aqueous pigment ink that provides enhanced storage stability of the ink.

A further object of the present invention is to provide an aqueous pigment ink that exhibits excellent water resistance and light resistance.

These and other objects of the present invention have been satisfied by the discovery of an aqueous pigment ink comprising a pigment, a dispersant, water and a water-soluble solvent, wherein the dispersant comprises a copolymer of a monomer (a) represented by general formula (A), and one or more monomers (b) selected from the group consisting of compounds represented by general formulae (B) and (C):

wherein $R_1$ and $R_2$, which may be the same or different, each independently represent a hydrogen atom or an alkyl group having 1 to 3 carbon atoms, $m_1$ represents an integer of 0 to 2, AO represents an oxyalkylene group having 2 to 4 carbon atoms, n represents an integer of 1 to 300, and X represents a hydrogen atom or an alkyl group having 1 to 3 carbon atoms,

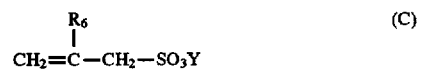

wherein $R_3$, $R_4$ and $R_5$, which may be the same or different, each represent a hydrogen atom, an alkyl group having 1 to 3 carbon atoms or $(CH_2)m_2COOM_2$, $R_6$ represents a hydrogen atom or an alkyl group having 1 to 3 carbon atoms, $M_1$, $M_2$ and Y, which may be the same or different, each independently represent a hydrogen atom, an alkaline metal, an alkaline earth metal, an ammonium, an alkylammonium or a substituted alkylammonium, and $m_2$ represents an integer of 0 to 2, with the compounds represented by general formula (B) including acid anhydrides thereof.

DETAILED DESCRIPTION OF THE INVENTION

Now, the aqueous pigment ink of a pigment type of the present invention will be described in detail.

The dispersant used in the aqueous pigment ink of the present invention is a copolymer of a monomer (a) represented by the above-mentioned general formula (A), and one or more monomers (b) selected from the group consisting of compounds represented by the above-mentioned general formulae (B) and (C).

In the above-mentioned general formula (A), $R_1$ and $R_2$, which may be the same or different, each independently represents a hydrogen atom or an alkyl group having 1 to 3 carbon atoms, preferably a hydrogen atom or a methyl group. In particular, it is preferred that both $R_1$ and $R_2$ are the same and represent a hydrogen atom, or alternatively that $R_1$ represents a hydrogen atom and $R_2$ represents a methyl group. Further, $m_1$ represents an integer of 0 to 2, preferably 0 to 1. Further, AO represents an oxyalkylene group having 2 to 4 carbon atoms, preferably an oxyalkylene group having 2 to 3 carbon atoms and more preferably an oxyethylene group. Further, n represents an integer of 1 to 300, preferably an integer of 2 to 150. X represents a hydrogen atom or an alkyl group having 1 to 3 carbon atoms, preferably a hydrogen atom, a methyl group or an ethyl group.

Preferably the above-mentioned monomer (a) is made up of 0.1 to 10 mol % of a monomer represented by the above-mentioned general formula (A) wherein n (the number of introduced oxyalkylene groups) is 1 or 2 (the monomer is hereinafter referred to as "monomer $a_1$"), and 90 to 99.9 mol % of a monomer represented by above-mentioned general formula (A) wherein n is 3 or more (the monomer is hereinafter referred to as "monomer $a_2$"). By using a copolymer that satisfies these conditions, an aqueous pigment ink can be provided that is further improved in pigment dispersibility. In addition, the viscosity of the ink can be improved, thereby improving the flying of the ink droplets. Therefore, an aqueous pigment ink that is particularly suitable as an ink for ink jet recording can be obtained.

More preferably, the proportion of the monomer $a_2$ in the above-mentioned monomer (a) is 92 to 98 mol % (that is, the proportion of the monomer $a_1$ is 2 to 8 mol %), and most preferably 93 to 97 mol % (that is, the proportion of the monomer $a_1$ is 3 to 7 mol %).

The above-mentioned monomer $a_2$ is preferably a monomer, wherein n is 3 to 150 and more preferably a monomer wherein n is 4 to 130.

Specific examples of the preferred compounds represented by the above-mentioned general formula (A) include esterified compounds formed between a polyalkylene glycol in which one terminal thereof is blocked with an alkyl group, such as methoxypolyethylene glycol, methoxypolyethylene polypropylene glycol, ethoxypolyethylene glycol, ethoxypolyethylene polypropylene glycol, propoxypolyethylene glycol, and propoxypolyethylene polypropylene glycol, and acrylic acid, methacrylic acid or a dehydrogenated (oxidized) reaction product of a fatty acid; and adducts of ethylene oxide, propylene oxide or butylene oxide (preferably ethylene oxide or propylene oxide) to acrylic acid, methacrylic acid, or a dehydrogenated (oxidized) reaction product of a fatty acid. In particular, esterified compounds formed between a polyalkylene glycol in which one terminal thereof is blocked with an alkyl group and acrylic acid, methacrylic acid or a dehydrogenated (oxidized) reaction product of a fatty acid are preferred. With respect to the adducts of ethylene oxide and propylene oxide, any of random adducts, block adducts or alternating adducts can be used. Preferably the addition molar ratio of the ethylene oxide to the propylene oxide in these adducts is from 10:90 to 90:10, and more preferably from 10:90 to 60:40.

The compound represented by the above-mentioned general formula (B) includes unsaturated monocarboxylic acids and their salts, and unsaturated dicarboxylic acids and their salts. Specific examples include acrylic acid, methacrylic acid, crotonic acid, metal salts of these acids, and unsaturated dicarboxylic acid monomers such as maleic anhydride, maleic acid, itaconic anhydride, itaconic acid, citraconic anhydride, citraconic acid, fumaric acid, or alkaline metal salts, alkaline earth metal salts, ammonium salts, and amine salts, such as alkyl amine salts and substituted alkyl amine salts, of these acids. In particular, acrylic acid, methacrylic acid, crotonic acid and metal salts of these acids are preferred. The preferred carbon number of the alkyl group of the amine salts is from 1 to 3. Preferred examples of the substituted alkyl amine include monoethanol amine, diethanol amine and triethanol amine.

Specific examples of the preferred compounds represented by the above-mentioned formula (C) include allylsulfonic acid, methallylsulfonic acid, or alkaline metal salts, alkaline earth metal salts, ammonium salts, and amine salts such as alkyl amine salts and substituted alkyl amine salts thereof. The preferred carbon number of the alkyl group of the amine salts and the preferred examples of the substituted alkyl amine are the same as those compounds represented by the above-mentioned general formula (B).

The dispersant obtained by copolymerizing the monomer (a) represented by general formula (A), and one or more monomers (b) selected from the group consisting of compounds represented by general formulae (B) and (C) preferably includes a copolymer obtained by copolymerizing the monomer (a) represented by general formula (A), and the monomer (b) represented by general formula (B).

The preparation method of the copolymers is not particularly limited so long as the function of the obtained copolymer as a dispersant is not impaired, and conventionally known preparation methods can be used. Specific examples include solvent polymerization methods described in Japanese Patent Application Laid-Open 59-162163, Japanese Patent Application Laid-Open 62-119147 corresponding to U.S. Pat. Nos. 4,870,120 and 5,137,945, Japanese Patent Application Laid-Open 62-78137 and Japanese Patent Application Laid-Open 62-70250, all of which are hereby incorporated by reference.

Examples of solvents used in the above-mentioned solvent polymerization methods include water; mono to tetrahydric alcohols such as methanol, ethanol and isopropanol; benzene, toluene and xylene; aliphatic hydrocarbons such as cyclohexane and n-hexane; ethyl acetate; acetone; and methyl ethyl ketone. Taking the handling and reaction facilities into account, water, methanol, ethanol and isopropanol are preferably used.

In the solvent polymerization method wherein an aqueous solvent is used as a polymerization initiator, a water-soluble polymerization initiator is used, such as ammonium salts and alkaline metal salts of persulfuric acids (i.e., peroxosulfuric acid and peroxodisulfuric acid) and hydrogen peroxide. In the solvent polymerization method wherein a solvent other than an aqueous solvent is used, for example, benzoyl peroxide or lauroyl peroxide is used as a polymerization initiator.

In combination with the polymerization initiator, it is possible to use a polymerization promoter, such as sodium hydrogensulfite, mercaptoethanol, and amine compounds.

The copolymer preferably has a molar ratio of the monomer (a) to the monomer (b) [(a)/(b)] of from 0.1/100 to 100/100, and more preferably from 1/100 to 70/100. By bringing the molar ratio between the monomers (a) and (b) to fall in the above range, the dispersant favorably exhibits excellent dispersibility, storage stability of dispersibility and water solubility.

In the copolymer, other copolymerizable monomers may be used additionally as a copolymerization component in a range that will not impair the function of the dispersant. Such a monomer includes, for example, (meth)acrylonitrile, (meth)acrylamide, styrene, and styrene sulfonic acid.

The above monomers (a) and (b), can be copolymerized by random copolymerization, block copolymerization, alternating copolymerization, or graft copolymerization. The type of polymer thus produced is not particularly restricted, so long as the function of the dispersant of the obtained copolymer is not impaired.

The weight-average molecular weight of the copolymer is preferably from 5,000 to 200,000, more preferably from 5,000 to 120,000 and most preferably from 5,000 to 70,000. If the copolymer has a high molecular weight, the viscosity becomes high thereby making the viscosity of the resulting ink high, and thereby leading to a fear that the performance of the ink will be lowered.

The above weight-average molecular weight can be obtained by gel permeation chromatography and calibrated in terms of poly (sodium styrene sulfonate).

In the above-mentioned copolymers, a copolymer of a polyalkylene glycol monoester monomer, in which preferably 1 to 300 oxyalkylene groups, more preferably 2 to 150 oxyalkylene groups, and most preferably 4 to 130 oxyalkylene groups, are introduced per molecule [particularly a polyalkylene glycol ester or an alkoxypolyalkylene glycol ester of (meth)acrylic acid, more particularly a polyalkylene glycol ester of (meth)acrylic acid], and a (meth)acrylic acid or (meth)acrylate monomer is desirable in view of the dispersibility and the dispersion stability of the pigment.

In the aqueous pigment ink of the present invention, by allowing the above-mentioned copolymer serving as a dispersant to be contained together with the pigment, nozzle clogging does not occur, particularly when printing is carried out by using an ink jet printer, so that a high storage stability of the ink can be obtained. Although the reason is not sufficiently clear and the present inventors do not wish to be bound by any particular theory of action, the mode of operation is believed to be as follows:

The copolymer in the ink surrounds the surface of each particle of the pigment in such a way that the charged sites in the molecules (e.g., the carbonyl sites) are adsorbed on the surface of each particle of the pigment with the side chains, i.e., the polyoxyalkylene groups, directed outward. Since the chain of the polyoxyalkylene group is long and is highly likely to cause steric hindrance, the agglomeration of particles of the pigment is hampered by the polyoxyalkylene groups. As a result, it seems that clogging at the nozzle is prevented and the storage stability of the ink is enhanced. Since the steric hindrance by the polyoxyalkylene groups is particularly improved when the pH of the aqueous pigment ink of the present invention is high, it is preferable that the pH of the aqueous pigment ink of the present invention should be set within a high range as described later.

In contrast, styrene copolymers, such as a styrene/acrylic acid copolymer, or vinylnaphthalene copolymers, such as a vinylnaphthalene/acrylic acid copolymer, that are conventionally used as a dispersant surround the surface of each particle of the pigment in such a way that the lipophilic groups in the molecules (e.g., the aromatic rings of the copolymer) are adsorbed on the surface of each particle of the pigment with the hydrophilic groups (e.g., the carbonyl sites of the copolymer) directed outward. The electric repulsive forces between the hydrophilic groups on the surfaces of particles of the pigment prevents the particles of the pigment from agglomerating, thereby enhancing the dispersibility of the pigment. However, it seems that since there is a limit on the electric repulsive forces between the hydrophilic groups and the hydrophilic group is not likely to exhibit steric hindrance, the particles of the pigment are apt to agglomerate and as a result the storage stability of the ink is lowered.

In the present invention, an additional dispersant other than the above-mentioned copolymers can be used in combination. Examples of the additional dispersant include anionic surface-active agents, such as a surface active agent selected from the group consisting of alkyl sulfonate salts, alkylbenzene sulfonate salts, alkylnaphthalene sulfonate salts, alkane or olefin sulfonate salts, alkyl sulfate ester salts, polyoxyethylene alkyl sulfate ester salts, alkylallyl ether sulfate ester salts, alkyl phosphate salts, alkyldiphenyl ether disulfonate salts, ether carboxylate, alkyl sulfosuccinate salts, α-sulfo fatty acid ether and α-sulfo fatty acid salts; a condensate of a higher fatty acid and an amino acid; and naphthenic acid salt. Preferred surface active agents include alkyl (in particular, linear alkyl) benzene sulfonate salts, alkane (in particular, secondary alkane) or olefin (in particular, α-olefin) sulfonate salts, alkylsulfonate ester salts, polyoxyethylene alkyl sulfonate ester salts, polyoxyethylene alkylallyl ether sulfate ester salts (in particular, polyoxyethylene alkyl ether sulfate ester salts), alkyl (in particular, monoalkyl) phosphate salts, ether carboxylate, alkyl sulfosuccinate salts, α-sulfo fatty acid ester and α-sulfo fatty acid salts. More preferably, alkyl sulfonate salts, alkyl (in particular, linear alkyl) benzene sulfonate salts, polyoxyethylene alkyl sulfonate ester salts, polyoxyethylene alkylallyl ether sulfate ester salts (in particular, polyoxyethylene alkyl ether sulfate ester salts) and alkyl sulfate ester salts can be used. Unless otherwise specified, within the context of the present invention, the term "alkyl" or "alkane" includes $C_1-C_{20}$ Compounds, preferably $C_1-C_{14}$, more preferably $C_1-C_8$. These agents can be used singly or in a combination of two or more thereof.

As cationic surface-active agents, aliphatic amine salts, quaternary ammonium salts, sulfonium salts, and phosphonium salts can be used. These agents can be used singly or in a combination of two or more thereof.

As non-ionic surface-active agents, those selected from the group consisting of polyoxyethylene alkyl ethers, polyoxyethylene alkylallyl ethers, sorbitan fatty acid esters, polyoxyethylene sorbitan fatty acid esters, polyoxyethylene sorbitol fatty acid esters, glycerin fatty acid esters, polyoxyethylene fatty acid esters and alkyl (poly)glycosides can be used. Preferred non-ionic surface-active agents include those selected from the group consisting of polyoxyethylene alkyl ethers and polyoxyethylene alkylallyl ethers. These agents can be used singly or in a combination of two or more thereof.

As amphoteric surface-active agents, one or more amino acid type or betaine type compounds can be used.

Also, polymetric dispersants can be used. The polymetric dispersants include, for example, proteins such as gelatin and casein; natural rubbers such as gum arabic; glucoxides such as saponin; cellulose derivatives such as alkyl cellulose, carboxyalkyl, cellulose and hydroxyalkyl cellulose; lignin sulfonates; natural polymers such as shellac; anionic polymers such as polyacrylate salts, styrene/acrylic acid copolymer salts, vinylnaphtalene/acrylic acid copolymer salts, styrene/maleic acid copolymer salts, vinylnaphtalene/maleic acid copolymer salts, salts of β-naphtalenesulfonic acid/ formaldehyde condensates, and polyphosphoric acids; and nonionic polymers such as polyvinyl alcohol, polyvinyl pyrrolidone, and polyalkylene glycol. These polymeric dispersants can be used singly or in a combination of two or more thereof.

When the above-mentioned additional dispersants are used, in view of the printing density of the printed images and the improvement in the dispersion stability under long-term storage, it is preferable that anionic surface-active agents should be used, or alternatively, anionic surface-active agents and nonionic surface-active agents should be used in combination with the amount of each surface-active agent being 0.01 to 5% by weight (preferably 0.01 to 3% by weight and more preferably 0.05 to 2% by weight) and with the weight ratio of the anionic surface-active agent to the nonionic surface-active agent being from 100:1 to 1:100 (preferably from 90:1 to 1:70, and more preferably from 70:1 to 1:50).

Further, when an anionic surface-active agent is used as the above-mentioned additional dispersant, the copolymer and the anionic surface-active agent are preferably formulated in a weight ratio of the copolymer to the anionic surface-active agent in a range of from 1:2 to 30:1. If the amount of the copolymer exceeds the above range, the wettability of the copolymer for the pigment becomes unsatisfactory and the dispersibility sometimes lowers. On the other hand, if the amount of the anionic surface-active agent exceeds the above range, the frothing tendency of the ink increases and therefore the handleability of the ink can become poor. More preferably, the ratio of the copolymer to the anionic surface-active agent is from 1:1 to 15:1, and most preferably from 1:1 to 10:1.

When the additional dispersant is used in combination, the additional dispersant is preferably contained at an amount of 1 to 10,000 parts by weight, more preferably 10 to 1,000 parts by weight, based on 100 parts by weight of the copolymer.

Any conventional pigment can be used in the aqueous pigment ink of the present invention, so long as it is a pigment. Examples of suitably pigments include carbon black; C.I. Pigment Yellow 1,5, 12, 14, 17, 24, 42, 53, 83, 95, 97, 98 and 100; C.I. Pigment Red 1,3,4,5, 17, 22, 31, 48, 48:3, 49, 53, 63, 64, 81:1, 83, 88, 101, and 122; C.I. Pigment Blue 1, 15, 15:3, 16, 27, 28, 29, 56, 60 and 63; and C.I. Pigment Black 1,7 and 11, with carbon black being particularly preferred.

In the present invention, the term "pigment" refers to a solid in the form of fine particles that is insoluble in water, solvents, oils, and the like, whereas the term "dye" refers to a compound that can dye water or solvents when it is dissolved in water or the solvents. ["Color Chemical Jiten" (first impression, issued in March, 1988, edited by CMC KK, Yukigousei Kagaku-kyokai), pp.45-].

Therefore, within the context of the present invention, pigments and dyes are different from one another.

In order to improve the storage stability of the ink, preferably the average particle diameter of the pigment is 0.05 to 3 μm, and more preferably 0.05 to 1 μm.

With respect to the distribution of the particle diameter, the present pigment is preferably made up of 60 to 98% by volume of particles having a particle diameter of less than 0.2 μm, 0.5 to 40% by volume of particles having a particle diameter of 0.2 μm or more but less than 0.6 μm, and 5% by volume or less of particles having a particle diameter of 0.6 to 3 μm. By using the pigment having the above particle diameter distribution, particularly in an ink for ink jet recording, a very small amount of coarse particles forms a coarse coating on the printer head, and as a result, the pigment particles are prevented from further sticking to the printer head, thereby to improving the long-term jetting stability of the ink. Further, when particles having a narrow particle distribution are used, the particles are likely to agglomerate. To the contrary, by using the pigment particles having the above particle diameter distribution, since the particles are prevented from agglomerating, the dispersibility of the pigment particles is further improved, thus further enhancing the long-term storage stability of the ink under high temperatures.

More preferably, the pigment is made up of 75 to 98% by volume of particles having a particle diameter of less than 0.2 μm, 0.5 to 20% by volume of particles having a particle diameter of 0.2 μm or more but less than 0.6 μm, and 3% by volume or less of particles having a particle diameter of 0.6 to 3 μm, and most preferably is made up of 85 to 98% by volume of particles having a particle diameter of less than 0.2 μm, 0.5 to 10% by volume of particles having a particle diameter of 0.2 μm or more but less than 0.6 μm, and 1.5% by volume or less of particles having a particle diameter of 0.6 to 3 μm.

The particle diameter distribution of the pigment can be measured, for example, by using a centrifugal settling type distribution measuring apparatus(manufactured by Shimadzu Corporation).

When carbon black is used as the above-mentioned additional dispersant pigment, in seeking to improve the dispersion stability after long-term storage and to improve the printing quality, the carbon black is preferably one having a volatile content of 4 to 25% by weight, more preferably 9 to 25% by weight, and most preferably 9.5 to 20% by weight. The volatile content is the value measured according to the description in Japanese Patent Application Laid-Open 3-210373, page 4, left lower column which is hereby incorporated by reference. It is also preferable to use carbon black having an oil absorption (JIS K 6221-1982) of 250 to 900 g/100 g, more preferably of 250 to 800 g/100 g, and most preferably 300 to 700 g/100 g.

When color printing is performed by the subtractive color mixing method using the aqueous pigment ink of the present invention, an aqueous pigment ink set comprising four inks containing a black pigment, a yellow pigment, a magenta pigment, and a cyan pigment, respectively, is preferably used. In this case, if carbon black is used as the black pigment, the yellow pigment is preferably a pigment selected from among C.I. Pigment Yellow 17 and 83, the magenta pigment is preferably a pigment selected from among C.I. Pigment Red 48:3, 83 and 122, and the cyan pigment is preferably C.I. Pigment Blue 15:3. This combination of pigments is preferable because black printed images which are excellent in black tone formed by the black ink only and processed black formed by mixing the three colors of the yellow ink, the magenta ink, and the cyan ink can be obtained and the color reproducibility is improved.

In the aqueous pigment inks of the present invention, the weight ratio of the pigment to the copolymer (pigment/copolymer) is generally from 1/10 to 10/1, preferably from 1/7 to 7/1, more preferably from 1/5 to 5/1. If the weight ratio is smaller than 1/10, in some cases the staining power of the pigment degrades, thereby lowering the performance of the ink. If the weight ratio is larger than 10/1, insufficient dispersion may take place, so that the pigment fails to be present in a stable state.

The above-mentioned water soluble solvent for use in the aqueous pigment ink of the present invention is used as a wetting agent or a humectant. Examples of the water soluble solvent include glycols, such as ethylene glycol, propylene glycol, diethylene glycol, triethylene glycol, tetraethylene glycol, and polyethylene glycol; glycerin; ethers of polyhydric alcohols, such as diethylene glycol diethyl ether, diethylene glycol monobutyl ether, ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether and propylene glycol monomethyl ether; acetates; thiodiglycol; nitrogen-containing compounds, such as N-methyl-2-pyrrolidone, 1,3-dimethylimidazolidinone, triethanol amine, formamide, and dimethyl formamide; and dimethyl sulfoxide. These water soluble solvents can be used singly or in a combination of two or more thereof.

In the aqueous pigment ink of the present invention (particularly in the case where it is used as an ink for ink jet recording), ion exchanged water is preferably used.

In addition to the above-described components, various components described below may be added to the aqueous pigment ink of the present invention if desired.

A polypropylene glycol can be added in order to balance between improved permeability of the ink into recording paper and prevention of strike-through of the ink (exudation of the ink into the backside of the recording paper). Preferably, the polypropylene glycol has a molecular weight of 400 to 3,000, and more preferably 400 to 2,000. When present, the polypropylene glycol is used in an amount of 0.01 to 3% by weight, and more preferably 0.01 to 1% by weight, in the aqueous pigment ink of the present invention.

Further, an aliphatic monohydric alcohol can be added to the aqueous pigment ink of the present invention in order to improve the drying properties of the ink. As the aliphatic monohydric alcohol, at least one of ethyl alcohol, 1-propyl alcohol, and 2-propyl alcohol is preferably used with particular preference given to 1-propyl alcohol. When present, the aliphatic monohydric alcohol is used preferably in an amount of 0.01 to 10% by weight, and more preferably 0.1 to 8% by weight, in the aqueous pigment ink of the present invention. By adjusting the ratio of the copolymer to the aliphatic monohydric alcohol to be from 1:10 to 1:1, the drying properties of the ink are further improved.

The intermittent jetting properties of the present aqueous pigment ink can be improved, particularly in the case wherein the ink is used in ink jet recording by adding a polyethylene glycol disulfate salt having a molecular weight of 400 to 3,500 (preferably 400 to 2,000). Preferably, the polyethylene glycol disulfate salt is used in an amount of 0.01 to 3% by weight, and more preferably 0.01 to 1% by weight, in the aqueous pigment ink of the present invention.

Similarly, in order to improve the intermittent jetting properties, a saccharide can be used in the aqueous pigment ink of the present invention. As the saccharide, preferably at least one of D-glucose, fructose, maltose, and saccharose is used, with particular preference given to saccharose. The saccharide is used preferably in an amount of 0.1 to 5% by weight, and more preferably 0.1 to 3% by weight, in the aqueous pigment ink of the present invention. By adjusting the ratio of the copolymer to the saccharide to be from 20:1 to 21:5, the intermittent jetting properties are further improved.

In order to further improve the intermittent jetting properties, a nitrogen-containing heterocyclic compound, such as N-methyl-2-pyrrolidone and 1,3-dimethyl-2-imidazolidinone, can be added to in the aqueous pigment ink of the present invention. The nitrogen-containing heterocyclic compound is used preferably in an amount of 0.01 to 10% by weight, and more preferably 0.1 to 5% by weight.

Further, the intermittent jetting properties can be improved by adding an aprotic polar solvent to the aqueous pigment ink of the present invention. As the aprotic polar solvent, at least one of dimethyl sulfoxide and sulfolane is preferably used. The aprotic polar solvent is preferably used in an amount of 0.01 to 10% by weight, and more preferably 0.1 to 5% by weight, in the aqueous pigment ink of the present invention.

When these polyethylene glycol disulfate salts, saccharides, nitrogen-containing heterocyclic compounds, and aprotic polar solvents that can improve the intermittent jetting properties are used in combination with a pigment having an average particle diameter of 0.05 to 3 μm, the intermittent jetting properties are even further improved.

In order to improve the fixability of the present aqueous pigment ink, an emulsion, such as an acrylic emulsion, an aqueous urethane emulsion, a styrene/butadiene emulsion, or a polyester emulsion, can be added. Preferably, an emulsion of an acryl/urethane copolymer is used, more preferably an emulsion of an acryl/urethane block copolymer (a copolymer having a main chain of an acrylic chain with urethane grafted as side chains). The weight-average molecular weight of the copolymer used in the emulsion is preferably 10,000 to 300,000, and more preferably 20,000 to 250,000. The emulsion is present in the aqueous pigment ink of the present invention in an amount of 0.01 to 10% by weight, and more preferably 0.05 to 5% by weight, in terms of solid content.

Similarly, in order to improve the fixability of the ink, a polyethyleneimine having a weight-average molecular weight of 800 to 300,000 can be added to the aqueous pigment ink of the present invention. As the polyethyleneimine, at least one of a polyethyleneimine grafted as side chains to a main chain of an acrylic chain, a polyethyleneimine that has been subjected to hydroxylation, and an amphoterically ionized polyethyleneimine is preferably used, with particular preference given to a polyethyleneimine that has been subjected to hydroxylation. The polyethyleneimine is used preferably in an amount of 0.01 to 10% by weight, more preferably 0.05 to 5% by weight, in the aqueous pigment ink of the present invention. The polyethyleneimine grafted as side chains to a main chain of an acrylic chain can be synthesized, for example, by a method wherein a polyacrylic acid is converted with thionyl chloride to a polyacrylic acid chloride and the polyacrylic acid chloride is completely reacted with a polyethyleneimine. The polyethyleneimine that has been subjected to hydroxylation can be synthesized, for example, by a method wherein a polyacrylic acid is converted with thionyl chloride to an acid chloride, and after the excess of the polyacrylic acid is reacted with a polyethyleneimine, the excess of the acid chloride is hydrolyzed back to the acid. The amphoterically ionized polyethyleneimine can be synthesized, for example, by a method wherein a polyacrylic acid is converted with thionyl chloride to a polyacrylic acid chloride and the polyacrylic acid chloride is reacted with part of a polyethyleneimine.

Other components including conventionally known various additives such as antifoaming agent of a silicone type or the like, a mildewproofing agent of a chloromethyl phenol type or the like, and/or a chelate agent such as EDTA, or an oxygen absorbing agent such as sulfite may be added to the aqueous pigment ink of the present invention.

Although the formulation of the aqueous pigment ink of the present invention is not particularly limited, generally the components are used in the following ranges on the basis of the total weight of the ink of the present invention:

| | |
|---|---|
| Pigment: | 1 to 20% by weight, preferably 2 to 10% by weight |
| Dispersant: | 0.3 to 30% by weight, preferably 1 to 15% by weight |
| Water-soluble solvent: | 1 to 30% by weight, preferably 5 to 20% by weight |
| Water: | 40 to 97.7% by weight, preferably 75 to 92% by weight |
| Other components: | 0 to 10% by weight, preferably 1 to 10% by weight |

Within the context of the present invention, the aqueous pigment ink composition comprises the composition resulting from admixture of the recited components, including any resultant reaction products formed by interaction or reaction of the added components.

The preparation method of the aqueous pigment ink of the present invention by mixing the above-mentioned components is not particularly limited. The components can be mixed by using a conventionally known apparatus such as a ball mill, a sand mill, an attritor, a basket mill and a roll mill.

In the preparation of the aqueous pigment ink of the present invention, it is preferable to remove coarse particles. For instance, an ink that does not cause clogging can be obtained by subjecting the ink obtained after formulation to a centrifugal machine to remove particles preferably of 3,000 nm or more in size, more preferably 2,000 nm or more, most preferably of 1,000 nm or more.

The viscosity (25° C.) of the thus obtained aqueous pigment ink of the present invention is generally 1 to 10 cps, preferably 1 to 5 cps, in order to improve the stability of jetting, particularly in the case wherein the ink is used in ink jet recording.

The surface tension (25° C.) of the aqueous pigment ink of the present invention is generally 25 to 50 dyne/cm, preferably 30 to 45 dyne/cm, in view of the permeability into the material to be printed.

To bring the viscosity to within the above range, for example, it is recommended that the pH of the aqueous pigment ink of the present invention be adjusted to such a value that the thickness of the adsorption layer (a layer formed on the surface of the pigment particle by adsorption) of the copolymer may be optimized, or alternatively, that the solid content in the ink is optimized.

To bring the surface tension to within the above range, for example, it is recommended that the above various surface-active agents are used in the ink.

The aqueous pigment ink of the present invention preferably has a specific heat of more than 4.00 J/gK but 4.15 J/gK or less, and a heat conductivity of $0.1 \times 10^{-3}$ to $50 \times 10^{-3}$ W/(cm.deg) in order to prevent clogging of the ink due to drying at the tip of a printer head and to prevent scorching of the ink due to heat energy at the time of printing. In this case, the pigment is preferably formulated in an amount of 2 to 5% by weight and the copolymer is formulated in an amount of 0.5 to 6% by weight. To bring the specific heat and the heat conductivity of the ink to within the above ranges, it is recommended that the amounts of the water (preferably ion exchanged water) and the water soluble solvent are suitably adjusted.

To improve the storage stability of the ink, the printing density of the printed images, and particularly the printing density of black, the aqueous pigment ink of the present invention preferably has a pH of 9.5 to 13.0, more preferably 10.0 to 12.0. To bring the pH to within the above range, it is recommended that a pH adjuster, such as an amino-alcohol, be added to the aqueous pigment ink of the present invention.

As the amino-alcohol, a monoethanol amine (e.g., 2-aminoethanol) or a triamino ethanol is preferably used.

To improve the fixability, particularly to materials on which recording will be made, such as plastics (in particular sheets for OHP), metals, and cloth, the aqueous pigment ink is preferably formulated so that the water-soluble resin component [the above copolymer as well as the above emulsion and the above polyethyleneimine (both are resin components for fixing the ink) which will be used as desired] in the supernatant liquid of the ink, after settling the pigment by an ultracentrifugation operation (50,000 G, 4 hours), is 2 to 7% by weight.

The aqueous pigment ink of the present invention is suitable for ink jet recording, and when it is used for ink jet recording, any printer that employs the ink jet recording system can be used. For example, printers that employ the piezo-electric recording technique that uses a piezo-electric element for a printing head and printers that employ the thermal jet recording technique that uses thermal energy generated by a heating resistor element in the printing head or the like can be used.

Further, the aqueous pigment ink of the present invention can also be used as an ink for writing utensils, such as fountain pens, ball-point pens, Magic Markers, and felt-tipped pens.

EXAMPLES

Having generally described this invention, a further understanding can be obtained by reference to certain specific examples which are provided herein for purposes of illustration only and are not intended to be limiting unless otherwise specified. In the following Examples, all the parts represent parts by weight unless otherwise stated.

Example 1

| | |
|---|---|
| Carbon black: | 15 parts |
| Copolymer of polyethylene glycol monoacrylate in which 45 mol of oxyethylene groups were introduced, and sodium acrylate [the molar ratio of the monomers (the former/the latter) = 2/8]: | 3 parts |
| Monoethanol amine: | 1 part |
| Diethylene glycol: | 5 parts |
| Ion exchanged water: | 77 parts |

The above components were dispersed for 4 hours by a sand mill to obtain Dispersion A.

| | |
|---|---|
| Dispersion A: | 33 parts |
| Diethylene glycol: | 4 parts |
| Ion exchanged water: | 63 parts |

After the components were formulated, the formulation was processed by a centrifugal machine at 4,000 rpm for 20 min to remove coarse particles, thereby obtaining an ink. This aqueous pigment ink was excellent in storage stability. This ink was used for printing by using a thermal jet printer BJ-10 Lite manufactured by Canon Inc. that employed a heater of a heating resistor element as a source of the thermal energy, and good printed images were obtained without causing clogging at the head portion. Further, it was found that these printed images were excellent in water resistance and light resistance. The results are shown in Table 1.

Example 2

| | |
|---|---|
| C.I. Pigment Red 81:1: | 15 parts |
| Copolymer of polyethylene glycol monomethacrylate in which 4 mol of oxyethylene groups were introduced, and sodium methacrylate [the molar ratio of the monomers the former/the latter) = 1/9]: | 3 parts |
| Diethylene glycol: | 5 parts |
| Ion exchanged water: | 77 parts |

The above components were dispersed for 4 hours by a sand mill to obtain Dispersion B.

| Dispersion B: | 33 parts |
| --- | --- |
| Diethylene glycol: | 4 parts |
| Ion exchanged water: | 63 parts |

After the components were formulated, the formulation method shown in Example 1 was followed to obtain an ink. This aqueous pigment ink was excellent in storage stability. When this ink was used for printing in the same manner as in Example 1, good printed images were obtained without causing clogging at the head portion. Further it was found that these printed images were excellent in water resistance and light resistance. The results are shown in Table 1.

Example 3

| C.I. Pigment Blue 15:1: | 15 parts |
| --- | --- |
| Copolymer of polyethylene glycol monoacrylate in which 130 mol of oxyethylene groups were introduced, and sodium acrylate [the molar ratio of the monomers (the former/the latter) = 3/7]: | 4 parts |
| Monoethanol amine: | 1 part |
| Diethylene glycol: | 6 parts |
| Ion exchanged water: | 74 parts |

The components were dispersed for 4 hours by a sand mill to obtain

| Dispersion C: | 33 parts |
| --- | --- |
| Diethylene glycol: | 6 parts |
| Ion exchanged water: | 61 parts |

After the components were formulated, the preparation method shown in Example 1 was followed to obtain an ink. The ink was particularly excellent in storage stability. When this ink was used for printing in the same manner as in Example 1, good printed images were obtained without causing clogging at the head portion. Further it was found that these printed images were excellent in water resistance and light resistance. The results are shown in Table 1.

Comparative Example 1

| Carbon black: | 15 parts |
| --- | --- |
| Copolymer of styrene and sodium acrylate [the molar ratio of the monomers (the former/the latter) = 3/7]: | 4 parts |
| Diethylene glycol: | 6 parts |
| Ion exchanged water: | 75 parts |

The above components were dispersed for 4 hours by a sand mill to obtain Dispersion D.

| Dispersion D: | 33 parts |
| --- | --- |
| Glycerin: | 5 parts |
| Ion exchanged water: | 62 parts |

After the components were formulated, the formulation method shown in Example 1 was followed to obtain an ink. The ink had a problem in storage stability, and precipitation was observed after storage test performed for one month at 40° C. When this ink was used for printing in the same manner as in Example 1, clogging occurred and good printed images were not obtained. These printed images were, however, excellent in water resistance and light resistance. The results are shown in Table 1.

Comparative Example 2

| C.I. pigment blue 15:3: | 18 parts |
| --- | --- |
| Copolymer of styrene and sodium maleate [the molar ratio of the monomers (the former/the latter) = 1/1]: | 6 parts |
| Glycerin: | 6 parts |
| Ion exchanged water: | 70 parts |

The above components were dispersed for 4 hours by a sand mill to obtain Dispersion E.

| Dispersion E: | 33 parts |
| --- | --- |
| Diethylene glycol: | 12 parts |
| Ion exchanged water: | 55 parts |

After the components were formulated, the formulation method shown in Example 1 was followed to obtain an ink. The ink had a problem in storage stability, precipitation was observed after storage test performed for one month at 40° C. When this ink was used for printing in the same manner as in Example 1, clogging occurred and good printed images were not obtained, although these printed images were excellent in water resistance and light resistance. The results are shown in Table 1.

Comparative Example 3

| Food Black 2 (dye): | 5 parts |
| --- | --- |
| Diethylene glycol: | 6 parts |
| Ion exchanged water: | 89 parts |

After the components were formulated, the preparation method shown in Example 1 was followed to obtain an ink of a dye type. When this ink was used for printing in the same manner as in Example 1, although good printed images were obtained, the printed images were poor in water resistance and light resistance. The results are shown in Table 1.

Comparative Example 4

| C.I Pigment yellow 5: | 15 parts |
| --- | --- |
| Homopolymer of Sodium acrylate: | 6 parts |
| Glycerin: | 6 parts |
| Ion exchanged water: | 73 parts |

The above components were dispersed for 4 hours by a sand mill to obtain Dispersion F.

| Dispersion F: | 33 parts |
| --- | --- |
| Glycerin: | 5 parts |
| Ion exchanged water: | 62 parts |

After the components were formulated, the formulation method shown in Example 1 was followed to obtain an ink. The ink was excellent in storage stability. However, when this ink was used for printing in the same manner as in Example 1, clogging occurred at the head portion and good printed images were not obtained. Further it was found that these printed images were poor in water resistance and light resistance. The results are shown in Table 1.

TABLE 1

|  | Examples | | | Comparative Examples | | | |
| --- | --- | --- | --- | --- | --- | --- | --- |
|  | 1 | 2 | 3 | 1 | 2 | 3 | 4 |
| Storage Stability | G | G | G | P | P | G | G |
| Occurrence of Clogging | G | G | G | P | P | G | G |
| Water Resistance | G | G | G | P | P | P | P |
| Light Resistance | G | G | G | G | G | P | G |

Storage Stability: Stored at 40° C. for one month.
G: No precipitation was observed.
P: Precipitation was observed.
Clogging:
G: All the dots were recovered by one cleaning operation.
P: Two or more cleaning operations were required for recovering all the dots.
Water Resistance: Subjecting the printed image to flowing water for 60 seconds.
G: Change in optical density was within 0 to 5.
P: Change in optical density was 5 or more.
Light Resistance: Subjecting the printed image to a weather meter for 8 hours.
G: Change in optical density was within 0 to 5.
P: Change in optical density was 5 or more.

As is apparent from the above results, the aqueous pigment ink of the present invention permits printing to be conducted without causing clogging and exhibits excellent storage stability, particularly when printing is carried out by using an ink jet printer, and therefore the intended object is well attained.

This application is based on Japanese Patent Application 7-343,032, filed with the Japanese Patent Office on Dec. 28, 1995, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

What is claimed is:

1. An aqueous pigment ink comprising a pigment, a dispersant, water and a water-soluble solvent, wherein the dispersant comprises a copolymer of a monomer (a) represented by formula (A), and one or more monomers (b) selected from the group consisting of compounds represented by formulae (B) and (C):

wherein $R_1$ and $R_2$, which may be the same or different, each independently represent a hydrogen atom or an alkyl group having 1 to 3 carbon atoms, $m_1$ represents an integer of 0 to 2, AO represents an oxyalkylene group having 2 to 4 carbon atoms, n represents an integer of 1 to 300, and X represents a hydrogen atom or an alkyl group having 1 to 3 carbon atoms,

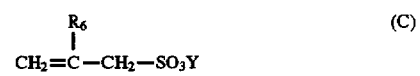

wherein $R_3$, $R_4$ and $R_5$, which may be the same or different, each independently represent a hydrogen atom, an alkyl group having 1 to 3 carbon atoms or $(CH_2)m_2COOM_2$, $R_6$ represents a hydrogen atom or an alkyl group having 1 to 3 carbon atoms, $M_1$, $M_2$ and Y, which may be the same or different, each independently represent a hydrogen atom, an alkaline metal, an alkaline earth metal, an ammonium, an alkylammonium or a substituted alkylammonium, $m_2$ represents an integer of 0 to 2, with the compounds represented by formula (B) including acid anhydrides thereof.

2. The aqueous pigment ink as claimed in claim 1, wherein the monomer (a) represented by formula (A) comprises an esterified compound formed between a polyalkylene glycol in which one terminal is blocked with an alkyl group, and an acid selected from the group consisting of acrylic acid, methacrylic acid and dehydrogenated (oxidized) reaction products of a fatty acid.

3. The aqueous pigment ink as claimed in claim 1, wherein the monomer (b) represented by formula (B) comprises acrylic acid, methacrylic acid, crotonic acid, or a metal salt thereof.

4. The aqueous pigment ink as claimed in claim 1, wherein the monomer (b) represented by formula (C) comprises allylsulfonic acid, methallylsulfonic acid, or an alkaline metal salt, an alkaline earth metal salt, an ammonium salt or an amine salt thereof.

5. The aqueous pigment ink as claimed in claim 1, wherein the copolymer is a copolymer of a polyalkylene glycol monoester monomer in which 1 to 300 moles of oxyalkyl groups are introduced, and a (meth)acrylic acid or (meth)acrylate monomer.

6. The aqueous pigment ink as claimed in claim 5, wherein the polyalkylene glycol monoester monomer comprises a polyalkylene glycol ester of (meth)acrylic acid.

7. The aqueous pigment ink as claimed in claim 1, wherein the monomer (a) is a mixture of 0.1 to 10 mol % of a monomer represented by formula (A) wherein n is 1 or 2, and 90 to 99.9 mol % of a monomer represented by formula (A) wherein n is 3 or more.

8. The aqueous pigment ink as claimed in claim 1, wherein monomer (a) and monomer (b) are present in a molar ratio of monomer (a)/monomer (b) from 0.1/100 to 100/100.

9. The aqueous pigment ink as claimed in claim 1, wherein the weight-average molecular weight of the copolymer is 5,000 to 200,000.

10. The aqueous pigment ink as claimed in claim 1, further comprising an anionic surface-active agent.

11. The aqueous pigment ink as claimed in claim 10, further comprising a nonionic surface-active agent.

12. The aqueous pigment ink as claimed in claim 11, wherein the anionic surface-active agent and the nonionic surface-active agent are each present in an amount of 0.01 to 5% by weight and in a weight ratio of the anionic surface-active agent to the nonionic surface-active agent of from 100:1 to 1:100.

13. The aqueous pigment ink as claimed in claim 1, wherein the aqueous pigment ink has a viscosity and storage stability sufficient to be used as an aqueous pigment ink for ink jet recording.

14. The aqueous pigment ink as claimed in claim 1, having a pH of 9.5 to 13.0.

15. The aqueous pigment ink as claimed in claim 1, wherein the pigment comprises 60 to 98% by volume of particles having a particle diameter of less than 0.2 µm, 0.5 to 40% by volume of particles having a particle diameter of 0.2 µm or more but less than 0.6 µm, and 5% by volume or less of particles having a particle diameter of 0.6 to 3 µm.

16. The aqueous pigment ink as claimed in claim 1, wherein the pigment comprises carbon black and the carbon black has a volatile content of 4 to 25% by weight.

17. The aqueous pigment ink as claimed in claim 1, wherein the pigment comprises carbon black and the carbon black has an oil absorption of 250 to 900 g/100 g.

18. The aqueous pigment ink as claimed in claim 1, further comprising a polypropylene glycol having a molecular weight of 400 to 3,000.

19. The aqueous pigment ink as claimed in claim 1, further comprising a members selected from the group consisting of polyethylene glycol disulfate salts having a molecular weight of 400 to 3,500, saccharides, nitrogen-containing heterocyclic compounds, and aprotic polar solvents.

20. The aqueous pigment ink as claimed in claim 1, further comprising an acryl/urethane copolymer emulsion or a polyethyleneimine having a molecular weight of 800 to 300,000.

21. The aqueous pigment ink as claimed in claim 1, having a viscosity at 25° C. of 1 to 10 cps and a surface tension at 25° C. of 25 to 50 dyne/cm.

22. The aqueous pigment ink as claimed in claim 1, having a specific heat of more than 4.00 J/gK but 4.15 J/gK or less, and a heat conductivity of $0.1 \times 10^{-3}$ to $50 \times 10^{-3}$ W/(cm.deg).

23. The aqueous pigment ink as claimed in claim 1, wherein a water-soluble resin component in a supernatant liquid of the ink, after settling the pigment by an ultracentrifugation operation (50,000 G, 4 hours), is 2 to 7% by weight.

24. The aqueous pigment ink as claimed in claim 1, comprising 1 to 20% by weight of the pigment, 0.3 to 30% by weight of the dispersant, 1 to 30% by weight of the water-soluble solvent and 40 to 97.7% by weight of water, based on the total weight of the ink.

25. The aqueous pigment ink as claimed in claim 8, wherein monomer (a) and monomer (b) are present in a molar ratio of monomer (a)/monomer (b) from 1/100 to 70/100.

26. The aqueous pigment ink as claimed in claim 1, wherein said water soluble solvent is a member selected from the group consisting of glycols, glycerin, ethers of polyhydric alcohols, acetate, thiodiglycol, N-methyl-2-pyrrolidone, 1,3-dimethylimidazolidinone, triethanol amine, formamide, dimethyl formamide, dimethyl sulfoxide and mixtures thereof.

* * * * *